United States Patent [19]

Hayashi et al.

[11] Patent Number: 4,637,092
[45] Date of Patent: Jan. 20, 1987

[54] VACUUM CLEANER WITH AGITATOR

[75] Inventors: Seizo Hayashi, Oumi Hachiman; Kenji Okano, Youkaichi; Nobuhiro Hayashi, Shiga, all of Japan

[73] Assignee: Matsushita Electric Industrial Co., Ltd., Osaka, Japan

[21] Appl. No.: 696,562

[22] Filed: Jan. 30, 1985

[30] Foreign Application Priority Data

Jan. 31, 1984 [JP] Japan .................................. 59-16627

[51] Int. Cl.⁴ ............................................... A47L 9/28
[52] U.S. Cl. ........................................ 15/319; 15/390; 318/461; 361/23
[58] Field of Search ................. 15/339, 319, 390, 391; 318/461; 361/23

[56] References Cited

U.S. PATENT DOCUMENTS

| 4,245,370 | 1/1981 | Baker | 15/319 |
| 4,328,522 | 5/1982 | Tryan | 15/319 X |
| 4,446,595 | 5/1984 | Nakada et al. | 15/390 X |

FOREIGN PATENT DOCUMENTS 3204272 8/1983 Fed. Rep. of Germany ........ 15/390

Primary Examiner—Chris K. Moore
Attorney, Agent, or Firm—Pollock, Vande Sande & Priddy

[57] ABSTRACT

In a vacuum cleaner of the type arranged to stop a motor when a driven brush is overloaded due to engagement with carpet or other obstacles, a starter circuit responsive to a manually operable power switch is employed to start the motor. The rotation of the rotary brush is detected by way of a sensor which produces a voltage. The starter circuit produces another voltage for a given period of time after the power switch is turned on, and these voltages are fed to a latching circuit which produces a control voltage when neither of the first nor second voltage is applied thereto, and the control voltage causes a control unit to interrupt power to the electric motor. As a result, once the latching circuit is put in a latching state after the brush has stopped, the motor is prevented from starting again unless the power switch is turned on again.

17 Claims, 8 Drawing Figures

VACUUM CLEANER WITH AGITATOR

BACKGROUND OF THE INVENTION

This invention relates generally to vacuum cleaner with an agitator, such as a rotary brush, used for easy suction of dust.

In conventional vacuum cleaners having an agitator around the suction inlet, a detecting element or a sensor is provided to detect the rotating state of the agitator, which is usually a rotary brush, and an electrical motor driving the rotary brush is controlled using an output from the sensor. More specifically, the control of the motor is effected such that power supply to the motor is cutoff when the rotation of the motor is interrupted due to overload applied to the rotary brush. Therefore, a user can remove a cause of such overloaded state and restart the motor after a safety state is achieved again. However, in actual usage, when a user removes a substance applying overload to the rotary brush, the sensor has a chance to detect the slight rotation of the brush when an external force is applied by a user, and this may result in a dangerous state that the motor suddenly starts rotating.

SUMMARY OF THE INVENTION

The present invention has been developed in order to remove the above-described drawback inherent to the conventional vacuum cleaner with an agitator.

It is, therefore, an object of the present invention to provide a new and useful vacuum cleaner with an agitator, whose motor driving the agitator is prevented from starting even if an external force is applied when reducing overload applied thereto.

According to a feature of the present invention while the rotation of the rotary brush is detected by way of a sensor to produce a voltage when detecting the rotation of the same, a circuit responsive to a power switch is provided for producing another voltage for a given period of time after the power switch is turned on, and these voltages are fed to a latching circuit, which is actualized in a preferred embodiment by a thyristor as will be described hereinlater, so that the latching circuit produces a control voltage when neither of the first nor second voltage is applied thereto, and this control voltage is used to interrupt application of power to the electric motor driving the rotary brush. As a result, once the latching circuit is put in latching state after the detection of the stopping state of the rotary brush during operation of the vacuum cleaner, the motor is prevented from starting again unless the power switch is turned on again after turning off the same.

According to another feature of the present invention, rotation of the rotary brush can be interrupted by interrupting the transmission of the rotational force from the motor when desired, and a switch is automatically operated at the time of such interruption so as to keep the rotation of the motor irrespective of the state of the rotary brush.

According to a further feature of the present invention, a sensor and a magnet used for the detection of the rotation of the rotary brush may be installed at a position remote from the rotary brush so that these members do not get dirty.

According to a still further feature of the present invention, a power switch of the vacuum cleaner is installed on a handle of the cleaner so that unintentional resetting causing a dangerous situation can be effectively prevented.

In accordance with the present invention there is provided a vacuum cleaner of the type arranged to drive a rotary brush disposed in a floor nozzle of the vacuum cleaner, comprising: an electric motor for driving the rotary brush; a manually operable power switch for connecting the electric motor to a power source; first means for detecting the rotating state of the rotary brush, the first means producing an output voltage only when detecting the rotation of the rotary brush; second means responsive to the power switch for producing a voltage across a resistor for a given period of time after the power switch is turned on; latching means responsive to both the output voltage from the first means and the voltage across the resistor of the second means for producing a control voltage when neither the output voltage nor the voltage across the resistor is applied thereto; and a control unit responsive to the control voltage for controlling electric input to the electric motor such that no power is fed to the electric motor in the presence of the control voltage.

In accordance with the present invention there is also provided a vacuum cleaner of the type arranged to drive a rotary brush disposed in a floor nozzle of the vacuum cleaner, comprising: an electric motor for driving the rotary brush; a power switch through which the electric motor is energized; first and second pulleys coaxially arranged to rotate together, the first pulley being used for being belt-driven by the electric motor by way of a first belt and the second pulley being used for belt-driving the rotary brush by way of a second belt; rotation detecting means having a sensor for detecting the rotation of the first or second pulley; a control circuit responsive to an output signal from the sensor for interrupting the energization of the electric motor when said first or second pulley is stationary, said control circuit being arranged to maintain nonenergizing state of the electric motor until a start signal is applied; and a starter circuit responsive to the power switch for starting the electric motor by generating said start signal.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
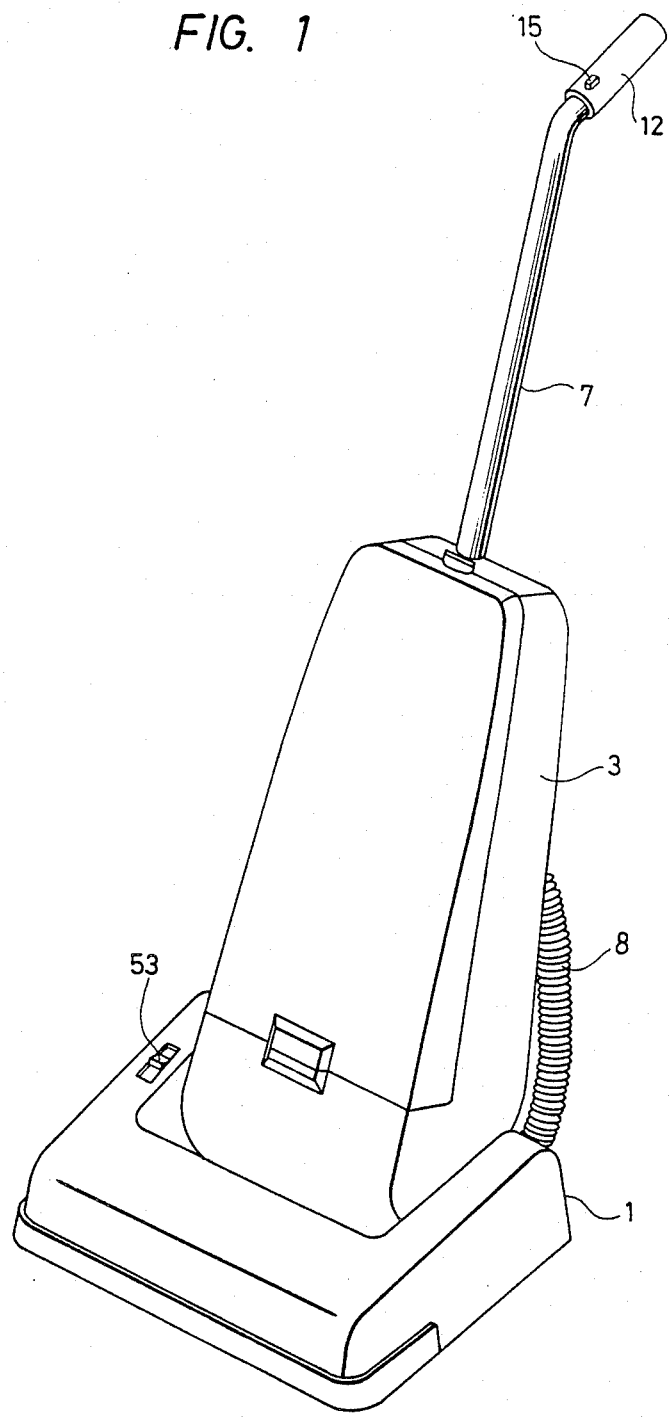
FIG. 1 is a perspective view showing a vacuum cleaner to which the present invention is applied.

Referring now to FIG. 1, a schematic perspective view of an upright vacuum cleaner, to which the present invention is applied, is shown. The vacuum cleaner generally comprises a body 3, a floor nozzle 1 connected to a lower portion of the body 3, and a handle 7 connected to an upper portion of the body 3. The reference 8 is a hose for leading air including dust from the floor nozzle 1 to the body 3 during sucking operation.

Figure 2:
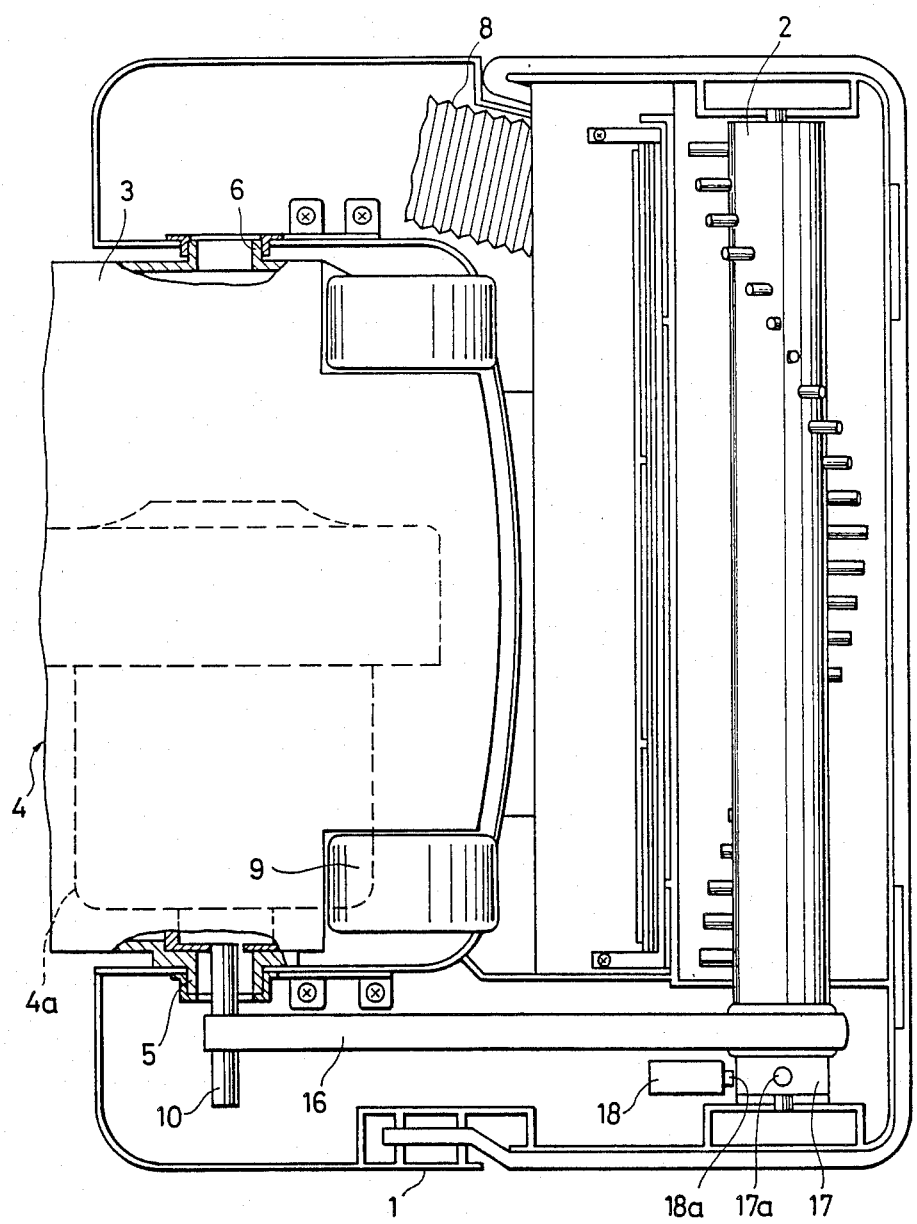
FIG. 2 is a partial cross-sectional view of a floor nozzle of the vacuum cleaner shown in FIG. 1.

As seen in FIG. 2, which is a plan view of the lower side of the floor nozzle 1, the floor nozzle 1 includes therein a rotary brush 2 functioning as an agitator, and the shape of the floor nozzle 1 seen from the bottom thereof is generally U-shaped to be engaged with the lower portion of the body 3 in such a manner that the floor nozzle 1 is rotatable at shafts 5 and 6. Sucked air including dust is filtered in the body 3 of the vacuum cleaner so that clean air passes through an electric blower 4 to be exhausted from an unshown exhaust outlet.

In FIG. 2, the reference 9 indicates rollers for the movement of the floor nozzle 1 on a floor, and the reference 10 is a shaft of the electric blower 4 which shaft penetrates into the floor nozzle 1 through the shaft 5. The reference 16 is a pulley for transmitting the rotational force of the shaft 10 to the rotary brush 2, and the reference 17a is a magnet attached to a pulley 17 such that the direction of magnetic line of force corresponds to the radial direction. A magnet sensor unit 18 is provided for detecting magnetic flux from the magnet 17a, and comprises a sensor 18a, such as a Hall generator, which is disposed to be spaced apart from the magnet 17a by a given distance.

Figure 3:
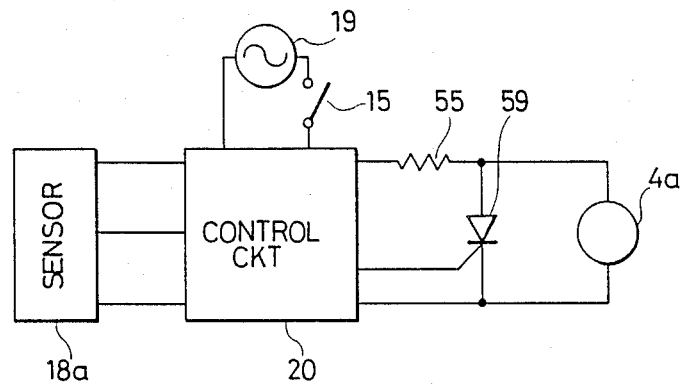
FIG. 3 is a basic circuit diagram of the vacuum cleaner according to the present invention.

FIG. 3 shows a basic circuit diagram of the vacuum cleaner according to the present invention. An output signal from the sensor 18a, for detecting the moving/stopping state of the rotary brush 2, is inputted to a control circuit 20 which receives a.c. power from an a.c. power source 19 via a power switch 15. The control circuit 20 comprises a d.c. power source circuit which produces a d.c. output by rectifying the a.c. power. The reference 59 is a thyristor connected via a resistor 55 to the d.c. power source in the control circuit 20. An electric motor 4a of the electric blower 4 is connected across the thyristor 59 to be driven by d.c. power from the d.c. power source in the control circuit 20.

The above-described vacuum cleaner operates as follows. In normal operating state the control circuit 20 responsive to the output signal from the sensor 18a does not produce a trigger signal to be fed to the gate of the thyristor 59. Therefore, the thyristor 59 remains in cutoff state. More specifically, the thyristor 59 is a switch for protecting overload of the rotary brush 2, and since the application of d.c. voltage from the control circuit 20 to the electric motor 4a is not prevented when the thyristor 59 is in off-state, the blower 4 is driven as it stands, and rotates together with the rotary brush 2 to perform cleaning.

In the case that the rotary brush 2 stops in abnormal condition, the sensor 18a detects the stopping state of the rotary brush 2 and the control circuit 2, to which the output thereof is inputted, supplies the gate of the thyristor with a trigger signal, to render the thyristor 59 conductive. Therefore, no voltage is applied to the electric motor 4a whose shunt circuit is short circuited, and the blower 4 stops.

When a force is applied to the rotary brush 2 at the time of cancelling the abnormal state of the rotary brush 2, the rotary brush 2 slightly rotates in receipt of the force. This rotation is detected by the sensor 18a, and the control circuit 20, to which this detection signal is inputted, stops supplying the trigger signal to the gate of the thyristor 59. However, since anode/cathode circuits of the thyristor 59 are connected via a resistor to a d.c. power source of the control circuit 20, conducting state is being held. Therefore, no voltage is applied to the electric motor 4a preventing the same from operating, and therefore it is safe.

In order to redrive the electric motor 4a, a connection between the a.c. power source 19 and the control circuit 20 may be temporarily cutoff by turning off the power switch 15, and reconnected by turning on the same.

The arrangement shown in FIG. 3 is a basic circuit illustrated for an easy understanding of the present invention, and this basic circuit is apt to suffer from unstable operation. In order to achieve stable operation, therefore, the basic circuit is modified as shown in FIG. 4.

Figure 4:
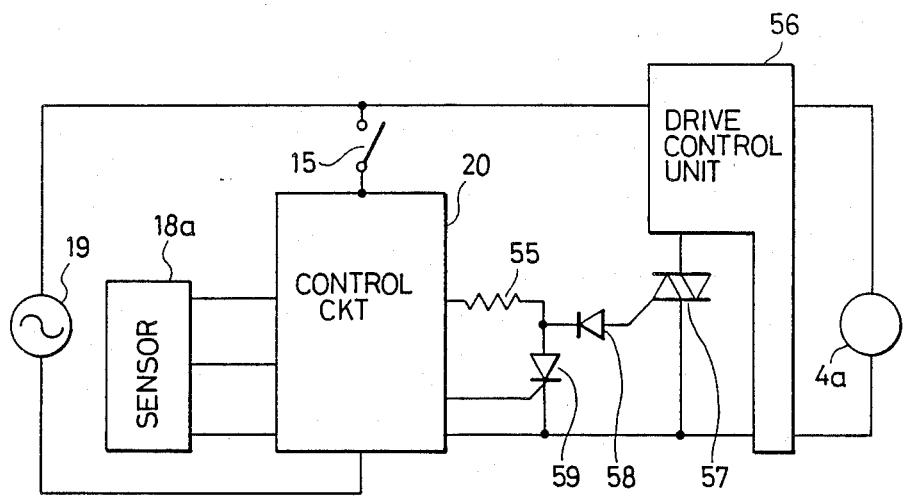
FIG. 4 is a modification of the circuit shown in FIG. 3.

Hence, FIG. 4 shows a modification of the basic circuit shown in FIG. 3, and parts which are the same as those in FIG. 3 are designated by like numerals while description thereof is omitted.

The reference 56 is a drive control unit which drives and controls the electric motor 4a, and this drive control unit 56 operates when a bidirectional triode thyristor (triac) 57 becomes conductive. A gate of the bidirectional thyristor 57 is connected to anode of the thyristor, provided for shunting, via a zener diode 58.

In the above structure, the thyristor 59 is in cutoff state in normal operating state, and a trigger signal is fed via the zener diode 58 to the gate of the bidirectional thyristor 57 to cause the bidirectional thyristor 57 to become conductive, and the electric motor 4a is driven by the drive control unit 56 which operates in response to the conducting state of the bidirectional thyristor 57. The drive control unit 56 may supply the electric motor 4a with either d.c. or a.c. power. In the case a commutator motor is used as the motor 4a, the motor 4a operates in receipt of either d.c. or a.c. power.

In the case that the rotary brush 2 is stopped in an abnormal state, the thyristor 59 becomes conductive, and the bidirectional thyristor 57 is put in cutoff state since no trigger signal is fed to gate thereof. As a result, the drive control unit 56 does not operate so that the electric motor 4a stops.

In this case, even if the rotary brush 2 slightly rotates with an application of a force thereto during removing operation of an abnormal state, the thyristor 59 remains in cutoff state, and therefore the electric motor 4a is not driven to ensure safety.

In order to redrive the electric motor 4a, a connection between the a.c. power source 19 and the control circuit 20 may be temporarily cutoff by turning off the switch 15, and reconnected by turning on the same.

Figure 5:
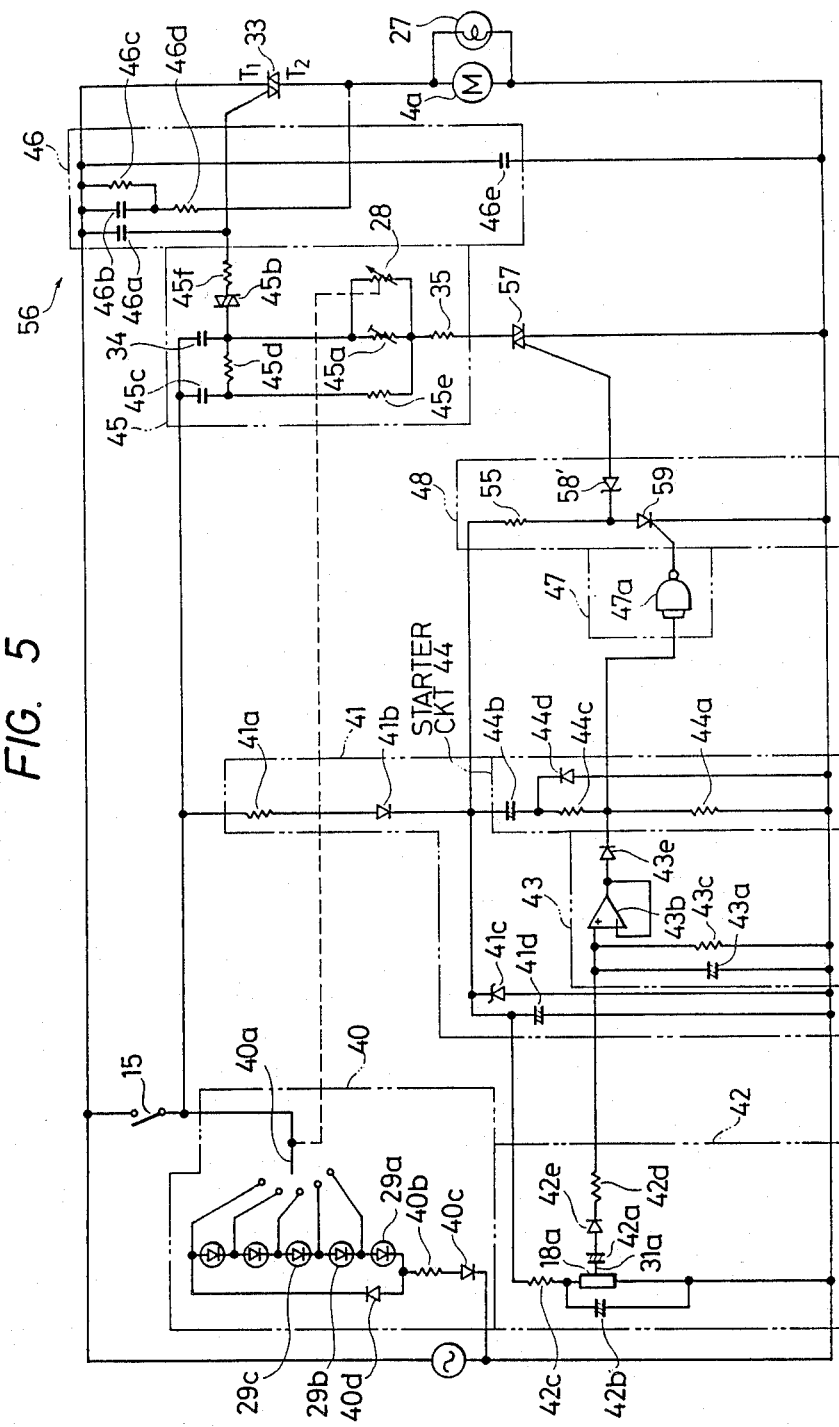
FIG. 5 is a circuit diagram of an embodiment of the vacuum cleaner according to the present invention, which shows detailed arrangement of the circuit of FIG. 4.

FIG. 5 shows a detailed circuit diagram of the arrangement shown in FIG. 4. As will be clear from the following description, the control circuit 20 shown in FIG. 4 includes an indicator circuit 40, a d.c. power source circuit 41, a sensor circuit 42 including the sensor 18a signal-converting circuit 43, a starter circuit 44, an inverter circuit 47, while the drive control unit 56 of FIG. 4 includes a speed control circuit 45, a noise limiting circuit, and a main thyristor 33. The drive control unit 56 in this embodiment of FIG. 5 is designed to supply the electric motor 4a with a.c. power.

The main thyristor 33, which may be a bidirectional triode thyristor known as triac, is used to control the speed of the electric motor 4a. More particularly, a variable resistor 28 included in the speed control circuit 45 is used to manually control and set the motor rpm through phase control of the main thyristor 33, and input power fed to the electric motor 4a via the main thyristor 33 is indicated by lighted number of LEDs 29a, 29b . . . included in the indicator circuit 40.

The indicator circuit 40 comprises a rotary switch linked with the movable contact of the variable resistor 28 used for speed setting. One terminal of the power switch 15 is connected to a movable contact of the rotary switch 40a. The LEDs 29a, 29b . . . are connected in series, and anodes thereof are respectively connected to stationary contacts of the rotary switch. A series circuit of the LEDs 29a, 29b . . . , a series circuit of a resistor 40b for obtaining a low d.c. voltage, and a diode 40c are all connected in series with the a.c. power source 19 via the power switch 15.

A diode connected in parallel to the series circuit of the LEDs 29a, 29b . . . is used to short a reverse voltage, which is unexpectedly applied to the LEDs 29a, 29b . . . , for preventing the life thereof from becoming short.

As described in the above, in the block 40, the LEDs 29a, 29b, . . . are lighted in sequence in accordance with the position of the movable contact of the variable resistor 28 to indicate power input to the electrical motor 4a. The d.c. power source circuit 41, whose input side is connected via the power switch 15 to one end of the a.c. power source 19, supplies the sensor circuit 42, the signal converting circuit 43, and the starter circuit 44 with a d.c. voltage. In this d.c. power source circuit 41, the reference 41a is a voltage dropping resistor, and the reference 41b is a diode for rectifying a.c. power to obtain d.c. power. The reference 41 is a zener diode for obtaining a constant d.c. voltage, and the reference 41f is a smoothing capacitor. The sensor circuit 42 generates an a.c. voltage on revolution of the rotary brush 2 at an output terminal 31a of the sensor 18a. More specifically, a Hall generator known as a Hall IC is used as the sensor 18a in this embodiment. The Hall IC 18a receives a d.c. voltage from the d.c. power source circuit 41 and is installed in the vicinity of the magnet 17a attached to the rotary brush 2 or the pulley 17 secured to the rotary brush 2 as seen in FIG. 2 so that the variation in magnetic flux caused by the rotation of the rotary brush 2 is detected. The Hall IC 18a produces an a.c. output when the rotary brush 2 rotates, and a d.c. output when the rotary brush is not rotating.

Next, a resistor 42c connected in series with the Hall IC 18a and a capacitor 42b connected in parallel therewith as auxiliary circuits are used for suppressing noise in the d.c. power applied to the Hall IC 18a. A resistor 42d connected to the output terminal 31a of the Hall IC 18a prevents noise from mixing into the output signal of the Hall IC 18a, and a diode 42c prevents the above-mentioned signal from flowing in a reverse direction into the Hall IC 18a. The reference 42a is a d.c. blocking capacitor for the Hall IC output signal.

The signal converting circuit 43 is used for charging a capacitor 43a with a signal wave obtained by the sensor circuit 42, namely, d.c. (on revolution) or zero potential (on stopping state) by d.c. blocking by the capacitor 42a, and further this potential is used as a buffer input of an operational amplifier 43b to apply a terminal voltage to a resistor 44a of a next stage. To the capacitor 43a is connected a discharging resistor 43c in parallel. Since the output signal from the sensor circuit 42 is arranged to be charged in the capacitor 43a of the signal converting circuit 43, pulse trains obtained from the sensor circuit 42 on revolution of the rotary brush 2 are converted into a voltage across the capacitor 43a. In other words, the resistor 42d of the sensor circuit 42 and the capacitor 43a of the signal converting circuit 43 form an integrator. When the rotary brush 2 stops, no pulse is applied from the sensor circuit 42 to the capacitor 43a, and therefore the charge prestored therein is discharged via the discharging resistor 43c lowering the voltage across the capacitor 43a. From the above, it will be understood that a positive voltage is developed at an output terminal of the buffer amplifier 43b only when the rotary brush 2 is rotating, and zero volt when the rotary brush 2 is not rotating. A diode 43c within an output ciruit of the amplifier 43b is used for preventing a signal from flowing in a reverse direction.

The starter circuit 44 comprises a capacitor 44b, a resistor 44c, and the above-mentioned resistor 44d which are all connected in series between the d.c. power source and ground, and generates a starting voltage using a current flowing through the above-mentioned resistor 44a connected in series with the capacitor 44b during charging operation of the capacitor 44b. More particularly, when the power switch 15 is turned on, the d.c. power source receives a.c. power so that the capacitor 44b is charged with a charging current flowing through the resistors 44c and 44a. As a result, a voltage drop occurs across the resistor 44a as the above-mentioned starting voltage when the charging current is flowing therethrough. A time period for which such voltage drop occurs may be selected by changing the time constant of the starter circuit 44, and is preferably set to approximately 1 to 3 seconds. With this arrangement, the starting voltage is produced for such a short period of time immediately after the power switch 15 is turned on. The resistor 44c is used for adjusting a suitable starting period of time and starting potential by adjusting the constants of the resistor 44a and the capacitor 44b. The reference 44d is a reverse blocking diode.

The output voltage from the signal converting circuit 43 is fed to the resistor 44a so that the output voltage is added to the above-mentioned starting voltage across the resistor 44a. In other words, a conductor or circuit connecting the output voltage from the signal converting circuit 43 to the starting voltage across the resistor 44a functions as an adder or a summing circuit to produce a resultant sum voltage which is fed to inputs of a NAND gate 47a operating as an inverter 47. Therefore, when the resultant sum voltage is higher than a predetermined voltage, then a low level output is produced by the inverter. On the other hand, when the resultant sum voltage is lower than the predetermined voltage, a high level output is produced by the same.

The output terminal of the inverter 47 is connected to gate of the thyristor 59 which constitutes a latching circuit 48 together with the current-limiting resistor 55 and a zener diode 58' used in place of the diode 58 shown in FIG. 4. In detail, once the thyristor 59 is triggered by a voltage fed to gate thereof, the voltage at the anode thereof is continuously kept low unless the d.c. power applied via the resistor 55 to the anode of the thyristor 59 is interrupted. The voltage at the anode of the thyristor 59 is used as a triggering voltage fed to the auxiliary triac 57 in the same manner as in the arrangement of FIG. 4.

More particularly, the auxiliary triac 57 is used to control the drive control unit 56 including the speed control circuit and a main triac 33. The speed control circuit 45 comprises a parellel connection of a semi-fixed resistor 45a and the above-mentioned variable resistor 28, which parallel connection is connected in series with a capacitor 34, a resistor 35 and the auxiliary triac 57, and the series circuit is conected via the power switch 15 to the a.c. power source. The speed control circuit 45 is arranged to trigger the main triac 33 by causing a diac 45b to brake over by a terminal voltage of the capacitor 34 with the variable resistor being operated. Capacitor 45c associated with the above-mentioned series circuit and resistors 45d, 45e form a compensation circuit for the capacitor 34, while a resistor 45f connected to the diac 45b is used to prevent noise from entering into gate of the triac 33 together with a capacitor 46a. A block 46 is a noise limiting circuit, and a series-parallel circuit of a capacitor 46b connected as a shunt circuit between two main terminals T1 and T2 of the main triac 33, and resistors 46c and 46d is a snubber circuit used for removing temporary malfunction due to slipping off and on of a plug, and a capacitor 46e is used for absorbing noise in power source. The main triac 33 is connected to the electric motor 4a, and the series circuit of the main triac 33 and the electric motor 4a is connected in series with the a.c. power source, and the amount of a.c. power input fed to the electric motor 4a is controlled by the main triac 33 which is phase controlled by the speed control circuit 45. A lamp 27 operating as an indicator is connected in parallel to the electric motor 4a.

In the above structure, the motor 4a is started by the operation of the starter circuit 44, and when the rotary brush 2 is rotating, the sensor circuit 42 generates a high-level output which makes an output of the inverter 47 zero via the converting circuit 43 and therefore the thyristor 59 is nonconductive and a voltage at a terminal of the resistor 55 connected thereto is kept at a high d.c. voltage. As a result, the auxiliary triac is triggered through the resistor 55 and the zener diode 58' to keep the operation of the electric motor 4a. After the rotary brush 2 starts rotating, let us assume that the rotary brush 2 engages carpet or an obstacle, such as a piece of cloth, to be overloaded and locked. When the rotary brush 2 is locked due to such overload, the thyristor 59 is triggered by a high level signal from the inverter 47 responsive to the signal converting circuit 43 since the sensor circuit 42 produces a low or zero voltage output signal. As the thyristor 59 is triggered to be conductive, the anode voltage thereof lowers to turn off the auxiliary triac 57. It is to be noted that since the unidirectional thyristor 59 keeps its conductive state until the voltage between anode and cathode lowers below a reference voltage once it becomes conductive, the auxiliary triac 57 is not triggered even if the rotary brush 2 is rotated with the power source being turned on after stopping of the rotary brush 2, and therefore the electric motor 4a is prevented from unintentionally starting when the user removes the obstacle engaged with the rotary brush 2. In other words, since the vacuum cleaner keeps stopping condition after the switch 15 is turned off until it is turned on, the brush 2 does not suddenly rotate even if the rotary brush is moved by hand by mistake, safety can be ensured. The reason that the diode 58 (see FIG. 4) or the zener diode 58' is connected to gate of the auxiliary triac 57 is to prevent the same from detecting forward voltage drop on conducting state of the thyristor 59.

The latch circuit 48 can also be readily formed by a flip-flop or the like.

When the power switch 15 is again turned on, although the rotary brush 2 is in stopping state normally, since a starting voltage occurs temporarily across the resistor 44a of the starter circuit 44 due to the charging of the capacitor 44b as described in the above, the thyristor 59 is not triggered. As a result, the voltage at the anode of the thyristor 59 is kept high to allow the auxiliary triac 57 to be triggered so that the main triac 33 is triggered to start the electric motor 4a.

Figure 6:
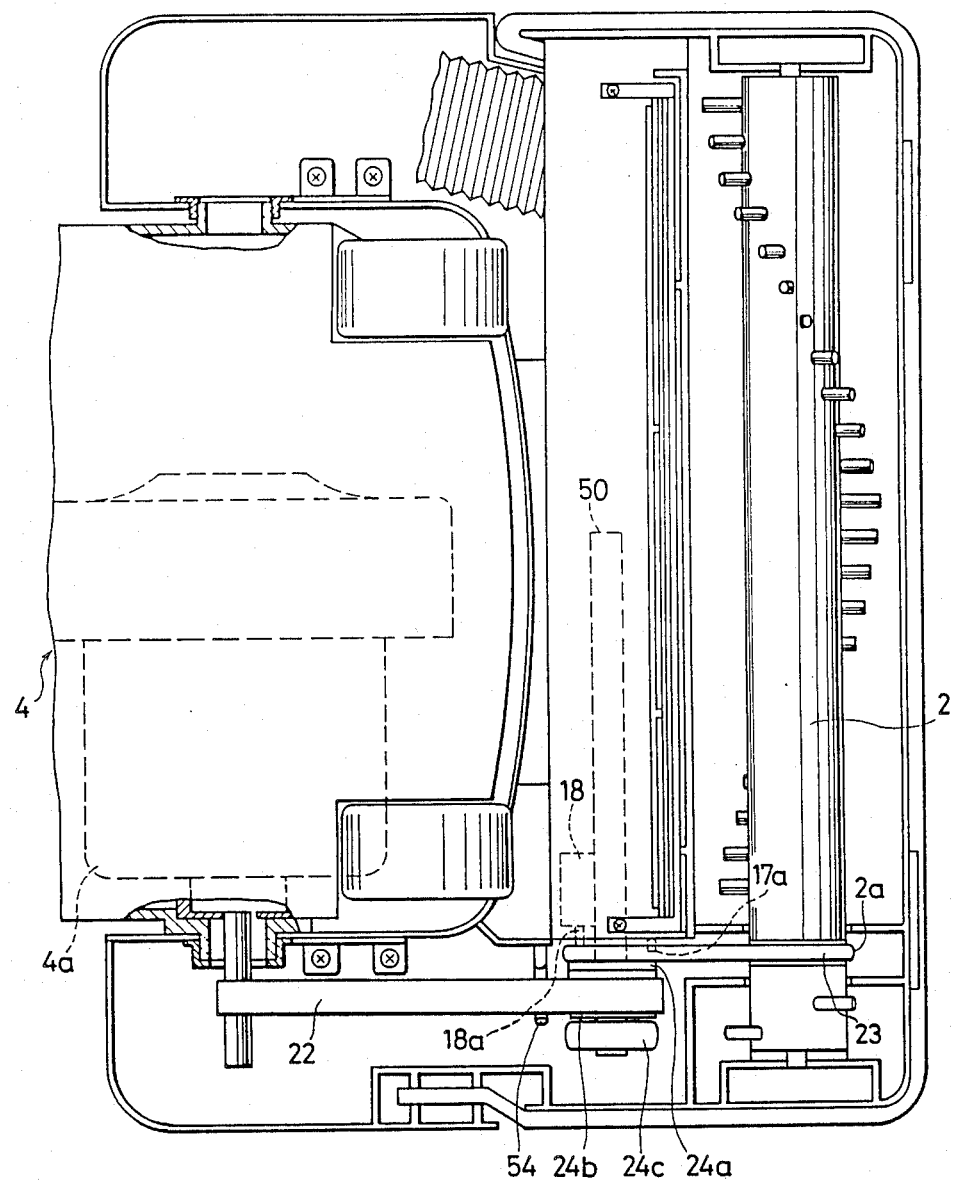
FIGS. 6 and 7 show another embodiment of the vacuum cleaner according to the present invention.
Figure 7:
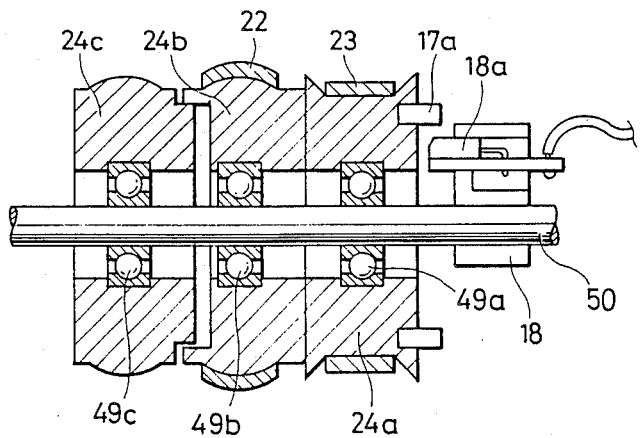

FIGS. 6 and 7 show another embodiment of the present invention. In this embodiment, the rotary brush 2 is not directly driven by a single belt transmitting rotational force from the shaft of the electric motor 4a of the electric blower 4, but is driven using at least two belts 22 and 23. In detail, a fixed shaft 50 is provided between the shaft of the electric motor 4a and the rotary brush 2 to support first and second pulleys 24a and 24b which are rotatably attached to the shaft 50. The first belt 22 is used to transmit the rotational force from the electric motor 4a to the second pulley 24b, while the second belt 23 is used to transmit the rotation of the first pulley 24a to the rotary brush 2. As best seen in FIG. 7, the first and second pulleys 24a and 24b are coaxially and fixedly attached or integrally formed so as to rotate together. The references 49a and 49b indicate bearings so that the first and second pulleys 24a and 24b are movable around the shaft 50. The tension of the above-mentioned belts 22 and 23 is adjusted so that slipping occurs at the side of the belt 22 when the rotary brush 2 is locked.

Although the magnet 17a is attached to the pulley 17 of the rotary brush 2 in the arrangement of FIG. 2, in this embodiment the magnet 17a is attached to the second pulley 24a, while the sensor unit 18 having the sensor 18a (Hall IC) is provided to detect the variation of magnetic flux from the magnet 17a. Since the sensor unit 18 and the magnet 17a are provided at a position remote from the rotary brush 2, the positional relationship between the sensor 18a and the magnet 17a is prevented from changing due to vibrations on the revolution of the rotary brush 2, and the characteristic of the sensor 18a and the magnet 17a is not changed due to dust or the like which is collected around the rotary brush 2, and therefore, stable characteristic is obtained. The magnet 17a is preferably attached to a surface of the first or second pulley 24a or 24b at a point spaced apart from the center of the first or second pulley, and the sensor 18a is placed in a direction normal to the surface of the first or second pulley 24a or 24b. The shaft 50 supporting the first and second pulleys 24a and 24b as well as the idler pulley 24c are cantilevered.

In the embodiment of FIGS. 6 and 7, an idler pulley 24c which is independent of the above-mentioned pulleys 24a and 24b is provided to the shaft 50 to be rotatable using a bearing 49c. This idler pulley 24 is used for interrupting the transmission of the rotational force from the motor 4a to the rotary brush 2 when it is intended not to rotate the rotary brush 2. To stop the rotary brush 2 the first belt 22 can be shifted to the idler pulley 24c by way of an arm 54 when necessary so as to interrupt the transmission of the rotational force. According to this system, cleaning can be carried out without blowing or splashing dust due to the rotation of the rotary brush 2 by stopping the rotary brush 2 in the case of a bare floor (while the electric motor 4a is being driven as will be described later).

Figure 8:
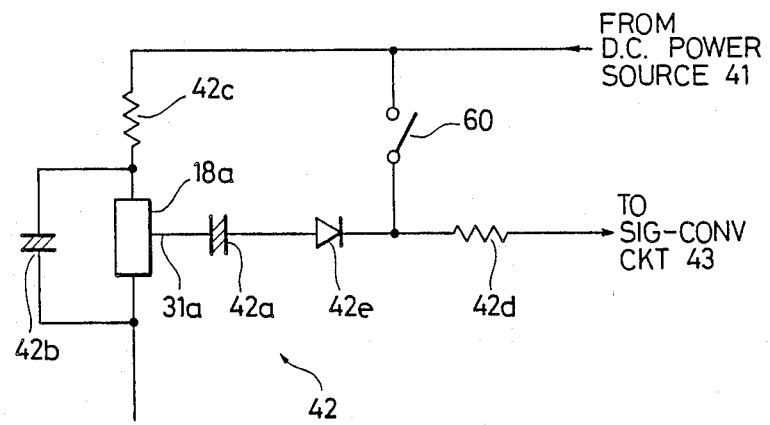
FIG. 8 shows a modified circuit having a switch linked with a lever.

The arm 54 is linked with the lever 53 shown in FIG. 1 so that the rotary brush 2 can be either rotated or stopped by manipulating the lever 53 from the outside. When the belt 22 is changed over to the idler pulley 24c, since the first pulley 24a stops, the sensor 18a produces the above-mentioned d.c. output, and therefore the electric motor 4a stops if the circuit of FIG. 5 is used without any change. In this embodiment in order to avoid such state, a switch linked with the lever 53 is automatically operated to keep the rotation of the electric motor when the belt 24c is changed over. FIG. 8 shows such a switch 60 interposed between cathode of the diode 42d of the sensor circuit 42 and positive power source line connected to the d.c. power source 41. The switch 60 may be connected to anode of the diode 42d rather than cathode thereof if desired. When the lever 53 is manipulated to shift the first belt 22 from the second pulley 24b to the idler pulley 24c, the switch 60 is automatically turned on. As a result a positive voltage appears at the output terminal of the sensor circuit 42 irrespective of the rotating state of the pulleys 24a and 24b. This positive voltage is fed to the signal converting circuit 43 to charge the capacitor 43a, and therefore, a high level output is fed from the signal converting circuit 43 to the inverter 47 which produces a low level gate signal in response to such high level input signal in turn. Accordingly, the thyristor 59 is not triggered to keep the rotation of the electric motor 4a. From the above, a vacuum cleaner has been actualized which is arranged to stop the rotation of the rotary brush 2 on cleaning of a bare floor and which is also equipped with a brush lock safety device.

In the circuit arrangement of FIG. 5, the power switch 15 may be provided to a grip portion 12 of the handle 7 as shown in FIG. 1. Installation of the power switch 15 at a position remote from the rotary brush 2 provides not only easy manipulation for on/off operation but also safety as follows. As described in the above, the electric motor 4a restarts after locking only when the power switch 15 is once turned off and then turned on. Therefore, if the power switch 15 were located at a position close to the floor nozzle portion 1, the power switch 15 would have a chance to be manipulated by mistake at the time of removal of an obstacle from the rotary brush 2. As a result, unintentional resetting is apt to occur which leads to the sudden start of the rotary brush 2 providing dangerous situation for user's hands. In this embodiment, however, such unintentional resetting can be avoided because the power switch 15 is remote from the floor nozzle portion 1.

As is apparent from the above description, when the rotary brush stops in an abnormal state, since the electric motor does not start even if the abnormal state is finished, it is possible to provide a safe vacuum cleaner because there is no fear of causing injury on removal of an obstacle from the rotary brush.

The above-described embodiments are just examples of the present invention, and therefore, it will be apparent for those skilled in the art that many modifications and variations may be made without departing from the scope of the present invention.

What is claimed is:

1. A vacuum cleaner of the type arranged to drive a rotary brush disposed in a floor nozzle of said vacuum cleaner, comprising:

(a) an electric motor for driving said rotary brush;
    (b) a manually operable power switch for connecting said electric motor to a power source;
    (c) first means for detecting rotation of said rotary brush, said first means producing an output voltage only when detecting the rotation of said rotary brush;
    (d) second means responsive to said power switch for producing a voltage across a resistor for a given period of time after said power switch is turned on;
    (e) latching means responsive to both said output voltage from said first means and said voltage across a resistor of said second means for producing a control voltage when neither of said output voltage nor said voltage across said resistor is applied thereto; and
    (f) a control unit responsive to said control voltage for controlling electrical input to said electric motor such that no power is fed to said electric motor in the presence of said control voltage.

2. A vacuum cleaner as claimed in claim 1, wherein said second means comprises a series circuit of a capacitor and a resistor which series circuit is responsive to power fed via said power switch from said power source.

3. A vacuum cleaner as claimed in claim 1, wherein said latching means comprises:

(a) a summing circuit for adding said output voltage from said first means and said voltage across said resistor to each other;
    (b) an inverter for inverting an output signal from said summing circuit; and
    (c) a thyristor whose gate is responsive to an output signal from said inverter.

4. A vacuum cleaner as claimed in claim 1, wherein said first means comprises:

(a) a sensor for producing an output signal each time said rotary brush makes a full turn;
    (b) an integrator responsive to said output signal; and
    (c) a buffer circuit responsive to an output signal from said integrator.

5. A vacuum cleaner as claimed in claim 1, wherein said control unit comprises:

(a) an auxiliary triac whose gate is reponsive to said control voltage;
    (b) a speed control circuit responsive to said auxiliary triac; and
    (c) a main triac responsive to an output signal from said speed control circuit.

6. A vacuum cleaner as claimed in claim 1, further comprising:

(a) third means for interrupting the transmission of the rotation of said electric motor to said rotary brush;
    (b) a manually operable lever for causing said third means to interrupt said transmission; and
    (c) a switch associated with said manually operable lever for supplying said latching means with a given voltage to cause the same to produce a voltage different from said control voltage to cause said control unit to supply electric power to said electric motor.

7. A vacuum cleaner as claimed in claim 6, wherein said switch is interposed between said first means and a d.c. power source.

8. A vacuum cleaner as claimed in claim 6, wherein said third means comprises an idler pulley movably supported around a shaft having first and second pulleys arranged to rotate togehter, said first pulley being used for being belt-driven by said electric motor and said second pulley being used for belt-driving said rotary brush, said first pulley and said idler pulley being disposed in the vicinity of said manually operable lever so that a belt linking said electric motor with said first pulley is shifted from said first pulley to said idler pulley.

9. A vacuum cleaner as claimed in claim 6, wherein a sensor of said first means is disposed around said shaft to detect the rotation of said first or second pulley.

10. A vacuum cleaner as claimed in claim 6, wherein said power switch is provided on a handle of said vacuum cleaner.

11. A vacuum cleaner as claimed in claim 1, wherein said power switch is provided on a handle of said vacuum cleaner.

12. A vacuum cleaner of the type arranged to drive a rotary brush disposed in a floor nozzle of said vacuum cleaner, comprising:
(a) an electric motor for driving said rotary brush;
(b) a power switch through which said electric motor is energized;
(c) first and second pulleys coaxially arranged to rotate together, said first pulley being used for being belt-driven by said electric motor by way of a first belt and said second pulley being used for belt-driving said rotary brush by way of a second belt;
(d) rotation detecting means having a sensor for detecting the rotation of said first or second pulley;
(e) a control circuit responsive to an output signal from said sensor for interrupting the energization of said electric motor when said first or second pulley is stationary, said control circuit being arranged to maintain a nonenergizing state of said electric motor until a start signal is applied; and
(f) a starter circuit responsive to said power switch for starting said electric motor by generating said start signal.

13. A vacuum cleaner as claimed in claim 12, further comprising an idler pulley movably supported around a shaft supporting said first and second pulleys, and a means for shifting said first belt from said first pulley to said idler pulley to interrupt the rotation of said rotary brush.

14. A vacuum cleaner as claimed in claim 13, wherein the shifting means comprises a manually operable lever disposed around said first pulley and said idler pulley.

15. A vacuum cleaner as claimed in claim 12, wherein said rotation detecting means comprises a magnet attached to said first or second pulley, and a magnetoelectric transducer placed close to said first or second pulley.

16. A vacuum cleaner as claimed in claim 15, wherein said magnet is attached to a surface of said first or second pulley at a point spaced apart from the center of said first or second pulley, and said sensor is placed in a direction normal to said surface of said first or second pulley.

17. A vacuum cleaner as claimed in claim 12, wherein a shaft supporting said first and second pulleys is cantilevered.

* * * * *